(12) United States Patent
Jakobsen et al.

(10) Patent No.: US 12,299,988 B2
(45) Date of Patent: May 13, 2025

(54) CONCEPT FOR DETECTING AN ANOMALY IN INPUT DATA

(71) Applicant: Grazper Technologies ApS, Copenhagen (DK)

(72) Inventors: Thomas Jakobsen, Copenhagen (DK); Max La Cour Christensen, Copenhagen (DK); Morten Suldrup Larsen, Copenhagen (DK)

(73) Assignee: Grazper Technologies ApS, Copenhagen (DK)

( * ) Notice: Subject to any disclaimer, the term of this patent is extended or adjusted under 35 U.S.C. 154(b) by 403 days.

(21) Appl. No.: 17/663,832

(22) Filed: May 18, 2022

(65) Prior Publication Data
US 2022/0392225 A1    Dec. 8, 2022

(30) Foreign Application Priority Data
May 31, 2021    (EP) .................................... 21176823

(51) Int. Cl.
   *G06V 20/52*    (2022.01)
   *G06N 20/20*    (2019.01)
   (Continued)

(52) U.S. Cl.
   CPC ............. *G06V 20/52* (2022.01); *G06N 20/20* (2019.01); *G06V 10/7747* (2022.01); *G06V 20/41* (2022.01)

(58) Field of Classification Search
   CPC ..... G06V 20/52; G06V 20/41; G06V 10/7747
   See application file for complete search history.

(56) References Cited

U.S. PATENT DOCUMENTS

| 8,285,060 B2 | 10/2012 | Cobb et al. |
| 2020/0394526 A1 | 12/2020 | Kim et al. |

(Continued)

FOREIGN PATENT DOCUMENTS

| CN | 107274432 A | 10/2017 |
| CN | 111083443 A | 4/2020 |
| CN | 112287816 A | 1/2021 |

OTHER PUBLICATIONS

Mahmood R Azimi-Sadjadi et al: "Detection and Classification of Buried Dielectric Anomalies Using Aseparated Aperture Sensor and a Neural Network Discriminator", IEEE Transactions on Instrumentation and Measurement, IEEE, USA, vol. 41, No. 1, Feb. 1, 1992 (Feb. 1, 1992).

(Continued)

*Primary Examiner* — Sam Bhattacharya
(74) *Attorney, Agent, or Firm* — SPL Patent Attorneys PartG mbB; Kieran O'Leary (57) ABSTRACT

Examples relate to an apparatus, a method and a computer program for detecting an anomaly in input data, to a camera device and a system comprising such an apparatus, and to a method and computer program for training a sequence of machine-learning models for use in anomaly detection. The apparatus for detecting an anomaly in input data is configured to process the input data using a sequence of machine-learning models. The sequence of machine-learning models comprising a first machine-learning model configured to pre-process the input data to provide pre-processed input data and a second machine-learning model configured to process the pre-processed input data to provide output data. The first machine-learning model is trained to transform the input data such, that the pre-processed input data comprises a plurality of sub-components being statistically independent with a known probability distribution. The second machine-learning model is an auto-encoder. The apparatus is (Continued)

configured to determine a presence of an anomaly within the input data based on the output of the second machine-learning model.

16 Claims, 4 Drawing Sheets

(51) Int. Cl.
  *G06V 10/774* (2022.01)
  *G06V 20/40* (2022.01)

(56) References Cited

U.S. PATENT DOCUMENTS

2020/0410322 A1  12/2020  Naphade et al.
2022/0351033 A1* 11/2022  Whatmough .......... G06N 3/045

OTHER PUBLICATIONS

Bo Li et al: "Decoupled Appearance and Motion Learning for Efficient Anomaly Detection in Surveillance Video", arxiv.org, Cornell University Library, 201 Olin Library Cornell University Ithaca, Ny 14853, Nov. 10, 2020 (Nov. 10, 2020).

Mahmud Hassan et al: "Learning Temporal Regularity in Video Sequences"; 2016 IEEE Conference on Computer Vision and Pattern Recognition (CVPR); Dec. 12, 2016; https://ieeexplore.ieee.org/document/7780455.

Guansong Pang et al: "Deep Learning for Anomaly Detection: A Review"; ACM Comput. Surv., vol. 1, No. 1, Article 1. Publication date: Jan. 2020; https://arxiv.org/pdf/2007.02500.pdf.

Rashmiranjan Nayak et al:"A comprehensive review on deep learning-based methods for video anomaly detection"; Image and Vision Computing vol. 106, Feb. 2021, 104078; https://www.sciencedirect.com/science/article/abs/pii/S0262885620302109?dgcid=rss_sd_all.

* cited by examiner

CONCEPT FOR DETECTING AN ANOMALY IN INPUT DATA

FIELD

Examples relate to an apparatus, a method and a computer program for detecting an anomaly in input data, to a camera device and a system comprising such an apparatus, and to a method and computer program for training a sequence of machine-learning models for use in anomaly detection.

BACKGROUND

In many surveillance scenarios, human operators are required in a (usually central) surveillance location in order to monitor different video feeds for anomalies. Anomalies may include the presence of unauthorized people or unwanted objects but can also include the presence of fires, accidents or similar important or dangerous events.

In installations with many cameras, the cameras are often connected to a VMS (video management system), which handles recording from all cameras; presents a graphical user interface (for switching to different view or viewing old footage), and potentially also alerts the operator if anything requires attention. Some VMSs allow anomaly detection plug-ins, in which the algorithm runs inside the VMS, to work with the existing feeds. For example, a rectangle may be drawn around an anomaly in the representation of the feed provided by the VMS.

Some methods for automating the process predominantly rely on algorithms in which a sufficiently large change in the pixels of the image from one video image frame to the following frame will trigger an alarm in order to alert the operator. Some methods may also rely on other traditional computer vision algorithms such as image normalization (to deal with changes in lighting), multi-frame averaging (to deal with noise), and edge detection for increased stability. For example, the open-source framework OpenCV 2 (Open Computer Vision 2) may provide such functionality.

Some methods for anomaly detection may use machine learning, for example using support vector machines (SVMs) for anomaly detection in time-series. These methods, however, are tailored to deal with low-dimensional cases (useful for fraud detection but not for the analysis of video data) and are also restricted to the reduced capabilities of SVMs (when compared to deep networks).

In some cases, deep learning is proposed for video anomaly detection in the literature. However, the proposed algorithms are generally inefficient and may not be suitable for video analysis. Deep network approaches that apply traditional supervised multi-category learning suffer from the shortage of video footage of anomalous events. Some approaches also use auto-encoders.

However, such concepts are generally not robust against changes in lighting, expected changes in geometry, or "normal"/expected changes in surroundings (such as changing weather). They may therefore require continuous lighting and might not work well in the presence of windows. Additionally, many false alarms may result in the user disabling the system and resorting to human surveillance. Furthermore, deep network-based approaches using traditional supervised learning often suffer from the lack of training cases, as footage of anomalies is rare. Furthermore, changes in geometry or panning/zooming of PTZ (pan/tilt/zoom) cameras is not possible. Even small displacements or vibrations of the camera may lead to adverse effects. Due to the differential nature of many approaches, slow update rates or single image analysis might also not be possible, as often two consecutive images are needed. The above-mentioned approaches that rely on the use of autoencoder are prone to unbalanced outputs that make it difficult to implement robust differencing and thresholding.

There may be a desire for an improved concept for detecting anomalies in input data, such as image data of a surveillance camera.

SUMMARY

Various aspects of the present disclosure are based on the finding that, in addition to an autoencoder machine-learning model, one or more machine-learning models may be used to preprocess the input data provided to the autoencoder, in order to generate pre-processed input data in a format that prevents the auto-encoder from "collapsing" during training.

For example, to improve the robustness of the anomaly detection in image data, the pre-processing may optionally comprise an (image) backbone, to disregard minute changes in the input data with respect to local translations, rotations and/or color changes. Using an image backbone with an autoencoder gives several advantages in the case of anomaly detection, but the approach has some pitfalls. To deal with these, the pre-processing comprises performing a decorrelation of sub-components of the output of the image backbone, so that the autoencoder receives a plurality of sub-components being statistically independent with a known probability distribution at its input. Such input is less susceptible to causing a collapse of the machine-learning models during joint training of the machine-learning models.

This input is processed by the autoencoder, which first reduces the dimensionality of the input and subsequently attempts to reconstruct it. As anomalies are rare, and therefore not part of the training of the autoencoder, it reconstructs a version of the pre-processed input data without the anomaly. By comparing the input and the output of the autoencoder, the anomaly may thus be detected.

This approach may provide a highly precise approach to anomaly detection that can detect even small objects, and that is highly robust against even large, expected changes. In other words, the system may have a low number of false positives and false negatives. Furthermore, this concept supports automatic calibration. For example, after installing the equipment, the system may analyze video footage of a period of time, e.g., a week, to determine what is normal visual behavior, i.e., night/day changes, appearance of rain, dirt and other. This video footage may be used to train the machine-learning models. The autoencoder may automatically learn to ignore dirt, paper and other items if present in the calibration feed (i.e. the set of training samples being used to train the machine-learning models), even if they appear in different positions of the image. The machine-learning models may thus be trained using only normal (i.e., non-anomalous) video footage, which facilitates the training, since recordings of anomalies are usually rare, and differ wildly (e.g., explosions, fires or very different objects that are a priori unknown). Furthermore, by using an image backbone, the proposed concept is robust to small changes in camera orientation and placement (pan/tilt/zoom).

Various aspects of the present disclosure relate to an apparatus for detecting an anomaly in input data. The apparatus comprises one or more processors and one or more storage devices. The apparatus is configured to process the input data using a sequence of machine-learning models. The sequence of machine-learning models comprises a first machine-learning model configured to pre-process the input data to provide pre-processed input data and a second machine-learning model configured to process the pre-processed input data to provide output data. The first machine-learning model is trained to transform the input data such, that the pre-processed input data comprises a plurality of sub-components being statistically independent with a known probability distribution. The second machine-learning model is an auto-encoder. The apparatus is configured to determine a presence of an anomaly within the input data based on the output of the second machine-learning model. Using an auto-encoder may enable robust anomaly detection even on single samples of input data, while the pre-processing provided by the first machine-learning model may be used to prevent the sequence of machine-learning models from "collapsing" during its training, i.e., from being trained such that the sequence of machine-learning models is unsuitable for detecting anomalies, e. g. by always outputting a constant value.

For example, the first machine-learning model may be trained to decorrelate a plurality of sub-components of the input data to generate the pre-processed input data. This results in the plurality of sub-components of the pre-processed input data being statistically independent with a known probability distribution.

In particular, the proposed concept may be used with input data that is image data, e.g., image data of a video stream, such as a video stream of a surveillance camera. Accordingly, the input data may be image data comprising a plurality of pixels. The plurality of pixels may correspond to the plurality of sub-components of the input data.

The image data may be further pre-processed, e.g. using the aforementioned image backbone, to reduce the spatial resolution while increasing the "depth" of the information being represented. For example, the image data may comprise a two-dimensional grid of pixels of width $w_1$, height $h_1$ and number of color channels $d_1$. The first machine-learning model may be trained to transform the image data into the pre-processed input data having a first dimension $w_2$, a second dimension $h_2$ and a third dimension $d_2$, with $w_2 < w_1$, $h_2 < h_1$ and $d_2 > d_1$.

Such a transformation may make the anomaly detection more robust with respect to small changes in camera orientation and placement.

For example, the first machine-learning model may comprise a backbone component trained to transform the image data into a representation having the first dimension $w_2$, the second dimension $h_2$ and the third dimension $d_2$ (e.g., "depth"), and a decorrelation component trained to decorrelate the transformed image data to generate the pre-processed input data with the plurality of sub-components being statistically independent with a known probability distribution. The backbone component may be used to make the anomaly detection more robust with respect to small changes in camera orientation and placement, while the decorrelation component is used to prevent the second machine-learning model from "collapsing" during training.

The second machine-learning model is an autoencoder. Correspondingly, the second machine-learning model comprises an encoder component and a decoder component.

In various examples, the apparatus is configured to determine a difference between the pre-processed input data and the output of the second machine-learning model to determine the presence of the anomaly within the input data. The auto-encoder may be used as predictor and may thus generate data that (ideally) does not contain an anomaly. If the pre-processed input data is different from the predicted data, the input data may be deemed to contain an anomaly.

For example, as outlined above, the input data may be image data. The apparatus may be configured to determine a location of the anomaly within the input data based on the difference. The apparatus may be configured to provide information on the location of the anomaly. For example, a location of the anomaly in the pre-processed input data (or in the output data) may be used to derive the location of the anomaly in the image data, e.g., based on a spatial relationship between the sub-components of the image data and the sub-components of the pre-processed input data. For example, the information on the location of the component may comprise one or more coordinates of a bounding box encompassing the anomaly. Such a bounding box may be overlaid over the image data.

In some examples, the apparatus may be configured to determine the presence and/or a location of the anomaly based on the difference and based on at least one threshold. The threshold may be used to set a balance between detecting "false positives" (e.g., detecting anomalies that are too small to be relevant) and "false negatives" (e.g., disregarding anomalies that are of interest in the respective application of the concept). By using thresholds, changes having a smaller impact may be disregarded.

Further techniques may be applied to fine-tune the balance between detecting "false positives" and "false negatives". For example, the apparatus may be configured to apply blurring on the difference between the pre-processed input data and the output of the second machine-learning model. The apparatus may be configured to determine the presence and/or the location of the anomaly based on the blurred difference between the pre-processed input data and the output of the second machine-learning model and based on at least one threshold. By using blurring, (spatially) smaller changes may be disregarded.

The threshold(s) and/or blurring may be tailored to the application at hand. As the proposed concept may be used in camera devices which can be used in many scenarios, at least the parameters pertaining to the thresholds and/or the blurring may be set by an external entity, e.g., by a Video Monitoring System. For example, the at least one threshold and/or the blurring parameter being used for blurring the difference between the pre-processed input data and the output of the second machine-learning model may be set by an external entity.

The proposed concept may be used with a variety of different types of input data. For example, the input data may be one of image data, such as encoded image data of a keyframe of a coded video stream, sensor data, and financial data.

Various aspects of the present disclosure further relate to a corresponding method for detecting an anomaly in input data. The method comprises processing the input data using a sequence of machine-learning models. The sequence of machine-learning models comprises a first machine-learning model configured to pre-process the input data to provide pre-processed input data and a second machine-learning model configured to process the pre-processed input data to provide output data. The first machine-learning model is trained to transform the input data such, that the pre-processed input data comprises a plurality of sub-components being statistically independent with a known probability distribution. The second machine-learning model is an auto-encoder. The method comprises determining a presence of an anomaly within the input data based on the output of the second machine-learning model.

Various aspects of the present disclosure further relate to a camera device comprising an imaging sensor and the above apparatus and/or being configured to perform the above method. The imaging sensor is configured to generate the input data. The apparatus or method is configured to process the input data generated by the image sensor. By including the anomaly detection in the camera device, a processing load of a device evaluating the data of the camera device may be decreased, providing a more de-centralized approach to anomaly detection. In such a case, a camera device with properly trained machine-learning models may be transferred to another evaluation device, such as a video management system, without having to port the anomaly detection logic to the evaluation device.

In various examples, the apparatus may be configured to determine a location of the anomaly within the input data, to generate an overlay highlighting the location of the anomaly, and to output a combined representation comprising the input data and the overlay highlighting the location of the anomaly in the input data. In this case, the evaluation device might not even have to evaluate meta data representing the detected anomaly, instead relying on the overlay being encoded into the image data provided by the camera device.

In another approach, the anomaly detection may be completed in a central evaluation device. Various aspects of the present disclosure relate to a system comprising an evaluation device and at least one apparatus as introduced above. The apparatus is configured to provide information on the difference between the pre-processed input data and the output of the second machine-learning model to the evaluation device. The evaluation device is configured to process the information on the difference to determine the presence of an anomaly in the input data.

Similar to the implementation in the apparatus, the evaluation device may be configured to determine the presence and/or a location of the anomaly based on the difference and based on at least one threshold. Additionally or alternatively, the evaluation device may be configured to apply blurring on the difference between the pre-processed input data and the output of the second machine-learning model, and to determine the presence and/or the location of the anomaly based on the blurred difference between the pre-processed input data and the output of the second machine-learning model and based on at least one threshold.

In some cases, the evaluation device may be used to complete the anomaly detection for multiple apparatuses. For example, the evaluation device may be configured to obtain the information on the difference from two or more apparatuses, and to determine respective locations of the anomaly in the input data of the respective apparatuses based on the respective difference. For example, this may be used to determine a three-dimensional location of the respective anomaly. For example, the evaluation device may be configured to determine a three-dimensional location of the anomaly based on the respective locations of the anomaly in the input data of the respective apparatuses.

Machine-learning models are trained to perform a certain task, e.g., trained to pre-process the input data in case of the first machine-learning model, and trained as an auto-encoder in case of the second machine-learning model. Accordingly, some aspects of the present disclosure relate to a method for training a sequence of machine-learning models for use in anomaly detection. The sequence of machine-learning models comprises a first machine-learning model configured to pre-process the input data to provide pre-processed input data and a second machine-learning model configured to process the pre-processed input data to provide output data. The first machine-learning model is trained to process the input data such, that the pre-processed input data comprises a plurality of sub-components being statistically independent with a known probability distribution. The second machine-learning model is an auto-encoder. The method comprises jointly training the sequence of machine-learning models based on a set of samples of training input data excluding anomalies. Through the joint training, a suitable sequence of machine-learning models may be trained, while avoiding a collapse of the second machine-learning model during training by performing decorrelation of the input data as part of the pre-processing.

In some examples, the first machine-learning model is trained based on a first loss function and the second machine-learning model is trained based on a second loss function. In other words, the training is performed with different optimization criteria to be considered during training.

For example, the second machine-learning model may be trained by generating training input data for the second machine-learning model based on the pre-processed input data provided by the first machine-learning model during the training of the sequence of machine-learning models. A subset of the plurality of sub-components of the pre-processed input data may be set to a fixed value in the training input data for the second machine-learning model. The second loss function may be based on a difference between the output of the second machine-learning model and the pre-processed input data. By using the output of the first machine-learning model for the training of the second machine-learning model, the machine-learning models may be jointly trained. By omitting portions of the data output by the first machine-learning model, the second machine-learning model is trained to reconstruct these portions, so that the second machine-learning model is trained as a predictor to predict the omitted portions of the data output by the first machine-learning model.

In various examples, the first loss function is based on a sum of cross-correlations of pairs of different sub-components of the pre-processed input data. By reducing the sum of cross-correlations during the training, the first machine-learning model is trained to decorrelate the sub-components.

As outlined above, the first machine-learning model may comprise a backbone component and a decorrelation component. Weights between neurons of the backbone component may be fixed during the joint training of the sequence of machine-learning models. In other words, a pre-trained backbone component may be used, with weights that are unaffected by the joint training of the sequence of machine-learning models.

Various aspects of the present disclosure relate to a computer program having a program code for performing at least one of the above methods, when the computer program is executed on a computer, a processor, processing circuitry, or a programmable hardware component.

BRIEF DESCRIPTION OF THE FIGURES

Some examples of apparatuses and/or methods will be described in the following by way of example only, and with reference to the accompanying figures, in which.

DETAILED DESCRIPTION

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Figure 1A:
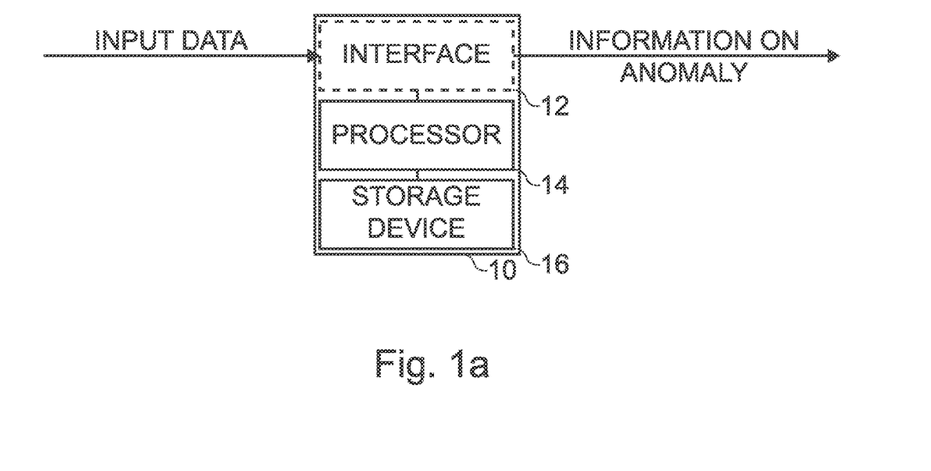
FIG. 1a shows a block diagram of an example of an apparatus for detecting an anomaly in input data.
Figure 3A:
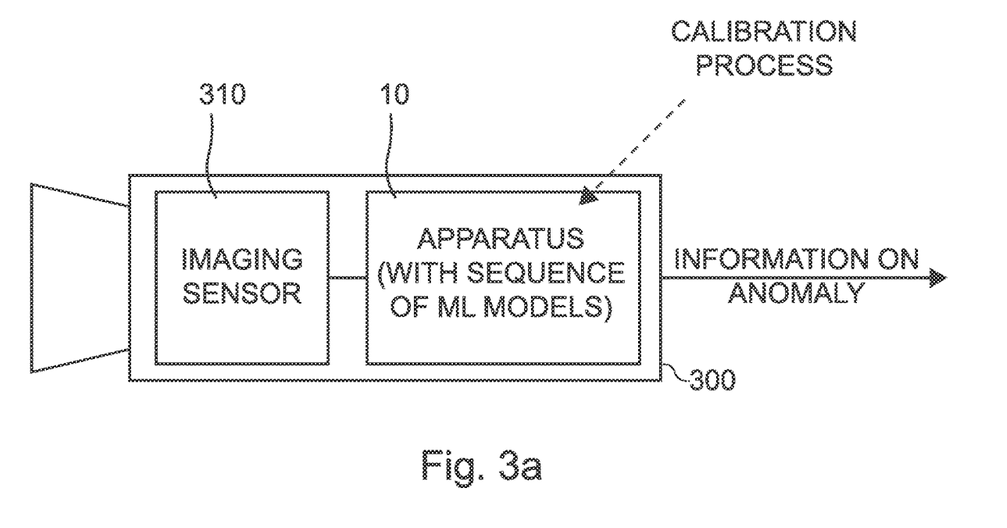
FIG. 3a shows a schematic diagram of an example of a camera device comprising an apparatus for detecting an anomaly in input data.

FIG. 1a shows a block diagram of an example of an apparatus 10 for detecting an anomaly in input data. The apparatus 10 comprises one or more processors 14 and one or more storage devices 16. The apparatus may further comprise at least one interface 12. The one or more processors are 14 are coupled to the at least one interface 12 and to the one or more storage devices 16. In general, the functionality of the apparatus is provided by the one or more processors 14, with the help of the at least one interface 12 (for exchanging information, e.g., for obtaining input data and/or for providing information on the anomaly), and/or with the help of the one or more storage devices 16 (for storing information, such as machine-learning models being used). For example, the at least one interface may be suitable for, and or configured to, obtaining/obtain image data from an imaging sensor of a camera (as shown in FIG. 3a).

The apparatus is configured to process the input data using a sequence of machine-learning models. The sequence of machine-learning models comprises a first machine-learning model configured to pre-process the input data to provide pre-processed input data and a second machine-learning model configured to process the pre-processed input data to provide output data. The first machine-learning model is trained to transform the input data such, that the pre-processed input data comprises a plurality of sub-components being statistically independent with a known probability distribution. The second machine-learning model is an auto-encoder. The apparatus is configured to determine a presence of an anomaly within the input data based on the output of the second machine-learning model.

Figure 1B:
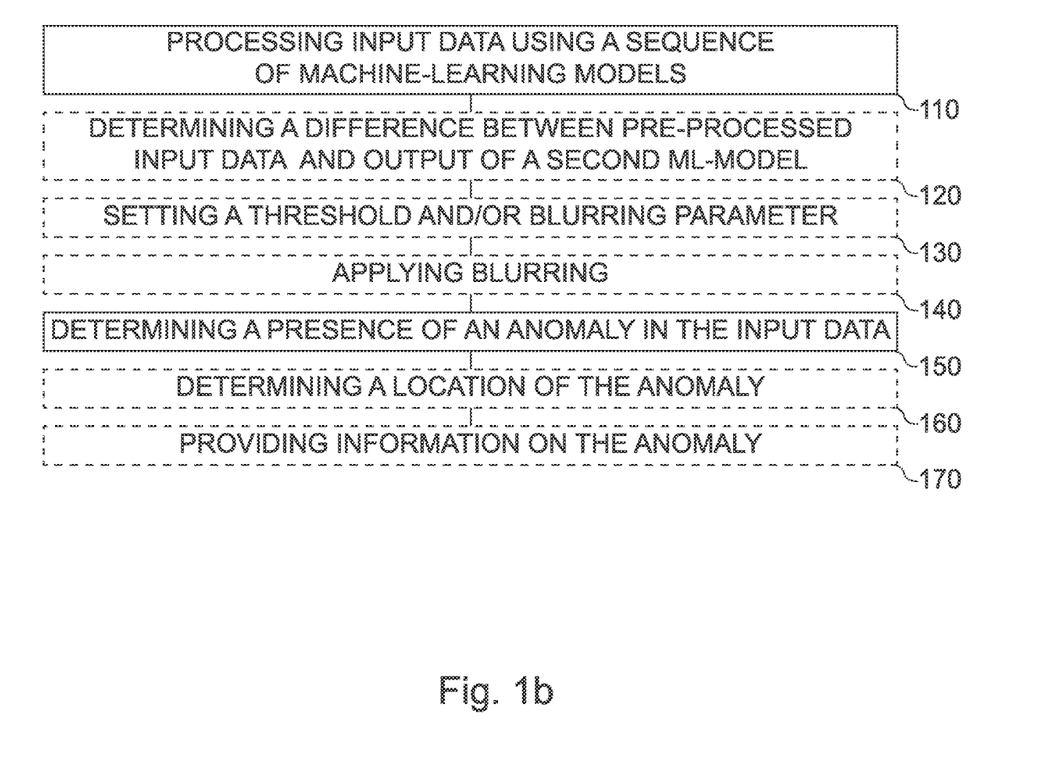
FIG. 1b shows a flow chart of an example of a method for detecting an anomaly in input data.

FIG. 1b shows a flow chart of an example of a corresponding (computer-implemented) method for detecting an anomaly in input data. The method comprises processing 110 the input data using the sequence of machine-learning models. The method comprises determining 150 the presence of an anomaly within the input data based on the output of the second machine-learning model.

The following description relates to the apparatus 10 introduced in connection with FIG. 1a, to the corresponding method of FIG. 1b, and to a corresponding computer program. Features introduced in connection with the apparatus can likewise be applied to the corresponding method and computer program (and vice versa).

The proposed concept relates to an apparatus, a method and a computer program for a highly robust detection of anomalies. For example, the proposed concept may be used for automatic detection of anomalous events in image data of video surveillance, e.g., for security or safety purposes through the detection of unwanted and potentially dangerous objects. For example, the proposed concept may be used for the automatic analysis of video footage of an airport or of an industrial site, to identify anomalous objects or events not permitted on site. However, the proposed concept may be used in other contexts as well, e.g., for the analysis of other types of sensor data, for the analysis of multivariate time series consisting of 3D human body poses describing movement over time (yielding an anomaly detector for identifying unusual people behavior) or for the analysis of numeric data, e.g., data of financial transactions.

The proposed concept is based on two components—a deep network architecture (in the following denoted "sequence of machine-learning models"), and a corresponding training and calibration process being applied on the deep network architecture, which is introduced in more detail in connection with FIGS. 4a to 4b. For example, the proposed concept may be implemented by a system comprising one or more cameras, the deep networks (i.e., the sequence of machine-learning models), an alert system, and the calibration process. Optionally, a video management system may be part of the system is well. The composition of the deep networks and the calibration and/or training of the networks is the focus of the proposed concept.

As outlined in connection with FIGS. 1a and 1b, the anomaly detector is implemented by a sequence of machine-learning models comprising a first machine-learning model for pre-processing the input data, and a second machine-learning model that generates an output being used to determine the presence of the anomaly.

Machine learning refers to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, in machine-learning based object recognition, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and associated training content information, the machine-learning model "learns" to recognize the content of the images, so the content of images that are not included of the training images can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model.

In the proposed concept, a different concept is used that is not based on object recognition, but instead on the prediction of an "expected" version of the pre-processed input data by the autoencoder, and a comparison between the pre-processed input data and the expected version of the pre-processed input data. With respect to the above example regarding the analysis of video data for anomalous events and/or objects, the anomaly detector is in effect implemented by using a sequence of machine-learning models that, given a video feed, is trained to predict how the surroundings usually look with the presently observed lighting and other external conditions. This prediction output is in essence another image similar to the observed input. In this example, the sequence of machine-learning models may be trained on a time-interval of videos of the observed scene (e.g., a week of videos of the observed scene). If the generated output matches the observed input, then no anomalies may be deemed to be present in the scene. On the other hand, if an unknown object is observed, e.g., a suitcase which has not been observed earlier, then the predictor module cannot predict the image because it has not observed such an object before.

Figure 2A:
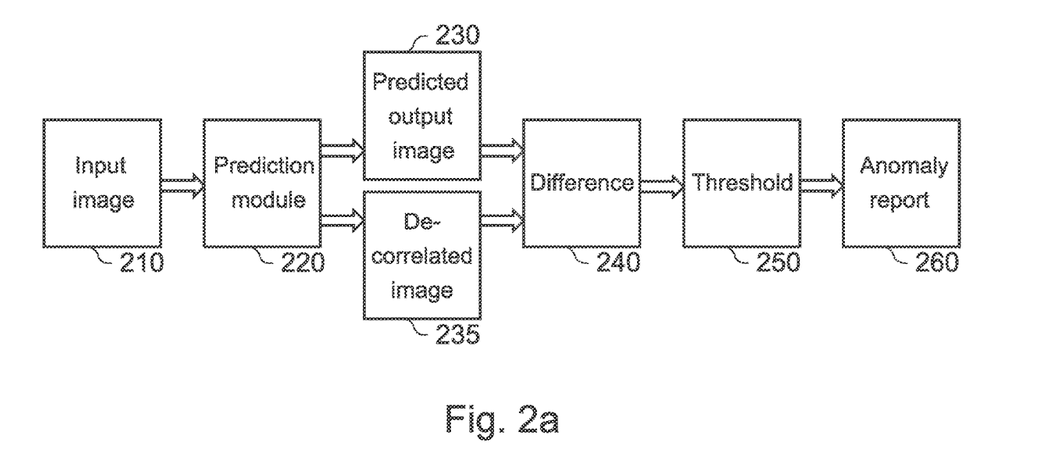
FIG. 2a shows a schematic diagram of an example of an anomaly detection system.

The process is illustrated in FIG. 2a. FIG. 2a shows a schematic diagram of an example of an anomaly detection system. In the proposed anomaly detection concept, according to the above example, an input image 210, which may correspond to the input data, is fed into a prediction module 220, which may comprise the sequence of machine-learning models, and which is used to generate a predicted output image 230 and a decorrelated image 235. The two images are compared to obtain a difference 240 between the two images. A thresholding procedure 250 may be used to distinguish anomalies of interest from anomalies that are too small to matter, and an anomaly report 260 (e.g. comprising information on the anomaly) may be generated.

A major challenge lies in the creation of the sequence of machine-learning models in the prediction module and in the creation of a (robust) training procedure such that the sequence of machine-learning models can properly and successfully predict elements of the scene, and such that the differencing and threshold operations are successful. In the proposed concept, this is implemented by combining an autoencoder structure (i.e., the second machine-learning model, with one or two preprocessing structures (i.e., the first machine-learning model), i.e., an optional "backbone" and a decorrelation module. Special care is taken for the training process not to "collapse" (i.e., to yield a sequence of machine-learning models that fail to provide an output that is suitable for anomaly detection). This process is detailed in connection with FIGS. 4a and 4b.

To simplify the explanation, with respect to the above example of anomaly detection in image data of a video stream, the example assumes that the image data comprises one or more RGB (Red-Green-Blue) images in form of a two-dimensional array of resolution $w_1 \times h_1$ with color channels $d_1$, i.e., the format $w_1 \times h_1 \times d_1$ where depth $d_1=3$, and e.g. width $w_1=1024$ and height $h_1=768$). The actual input may have additional channels or be in a different format, including input from other types of cameras, IR (infrared), multispectral or even other 2D input fields such as radar or lidar. In addition, outside the example being used throughout the document, other types of input data may be used as well. For example, the input data may be one of image data, such as the above two-dimensional RGB image or encoded image data of a keyframe of a coded video stream, sensor data, multi-variate time-series data of body movement, and financial data. The anomaly detection can work on raw image data or compressed streams like H.264/H.265. The compressed streams may be decompressed first using either a software or hardware decoder, or the anomaly detection may be directly applied on keyframes of the compressed stream.

In the following, the contribution of the deep networks of the sequence of machine-learning models is shown. In the present disclosure, the term "sequence" is chosen, as the respective machine-learning models are applied sequentially, with the input data being applied at the input of the first machine-learning model of the sequence and the output being provided at the output of the last machine-learning model of the sequence, with the output of the machine-learning models being provided to the input of the subsequent machine-learning model of the sequence. As will be appreciated by the person skilled in the art, each of the proposed first and second machine-learning model may comprise one or more sub-models. The prediction module 220 shown in FIG. 2a comprises or consist of an autoencoder with at least one of two additions: An optional backbone and a decorrelation module. The proposed concept, which is crucial for the resulting precision and robustness, relates to the specific combination of the machine-learning models. In particular, using an autoencoder with a machine-learning model that is used to decorrelate sub-components of the input data is unknown in other approaches.

Figure 2B:
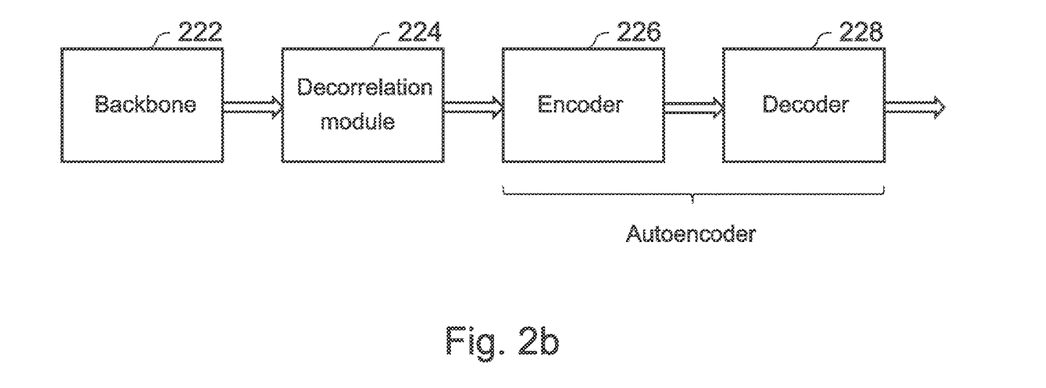
FIG. 2b shows a schematic diagram of a prediction module of an anomaly detection system.

FIG. 2b shows a schematic diagram of a prediction module of an anomaly detection system. For example, as shown in FIG. 2b, the first machine-learning model may comprise a first sub-model 222 that implements the above-mentioned backbone and a second sub-model 224 that implements the decorrelation, and the second machine-learning model may comprise a first sub-model 226 that is the encoder of the auto-encoder and a second sub-model 228 that is the decoder of the autoencoder. For example, the output of the first sub-model 222 may be provided at the input of the second sub-model 224 of the first machine-learning model. The output of the second sub-model 224 of the first machine-learning model (i.e., the pre-processed input data) may be provided to the input of the first sub-model 226 of the second machine-learning model, and the output of the first sub-model 226 of the second machine-learning model may be provided to the input of the second sub-model 228 of the second machine-learning model. The output of the second sub-model 228 of the second machine-learning model may correspond to the output of the second machine-learning model. In addition, the output of the second sub-model of the first machine-learning model (i.e., the pre-processed input data) may be output by the sequence of machine-learning models.

In some examples, the models and sub-models may be combined in an arbitrary fashion (while retaining their internal order)—for example, the backbone model and the decorrelation model may be combined in a single machine-learning model (having different layers implementing the backbone and the decorrelation functionality) and the encoder and decoder may be combined in a single machine-learning model (having different layers implementing the encoder and the decoder functionality). In some examples, the sequence of machine-learning models may be combined in a single machine-learning model, with a first set of layers implementing the functionality of the first machine-learning model and a distinct second set of layers implementing the functionality of the second machine-learning model. For example, the first and the second machine-learning model may be deep networks, i.e. artificial neural networks with multiple hidden layers between their input layer and output layer.

In the following, the functionality of the optional first sub-model of the first machine-learning model is introduced: the backbone (module). The backbone introduced in the following is an "image backbone", i.e., a backbone for transforming image data. However, similar backbones may be implemented for arbitrary types of input data, e.g., sensor data or financial data.

With respect to image data, the two-dimensional array of image data (of dimensions $w_1 \times h_1 \times d_1$) may be converted to a different representation than RGB using the so-called network backbone, which may be a pre-existing deep network such as AlexNet, ResNet-101, MobileNet, or similar, or an appropriately concatenated version of such a network.

The (image) backbone may be a traditional image-based deep learning component that turns the input resolution of w×h RGB pixels (depth d=3) into say $$h_2 * w_2 = \left(\frac{w}{32}\right) \times \left(\frac{h}{32}\right)$$

cells of depth dimension, e.g., $d_2$=512. In other words, the image data may comprise a two-dimensional grid of pixels of width $w_1$, height $h_1$ and number of color channels $d_1$, and the first machine-learning model may be trained to transform the image data into the pre-processed input data having a first dimension $w_2$, a second dimension $h_2$ and a third dimension $d_2$. In more general terms, at the output of the first sub-model 222 of the first machine-learning model, the input data may be transformed into a different representation. The first sub-model 222 (i.e. the backbone) may thus be configured to transform the input data into transformed input data, with the transformed input data having a different format than the input data. In general, the first and second dimensions (e.g. height and width) of the output of the backbone may be smaller than the first and second dimensions of the input data, and the third dimension (e.g., the depth) may be larger. In other words, the respective dimensions may be chosen such that $w_2 < w_1$, $h_2 < h_1$ and $d_2 > d_1$. The backbone may be trained such that minor variations in the image, for example local translations, rotations and color changes are ignored in the sense that the output from the backbone remains constant. In other words, the first sub-model of the first machine-learning model (i.e., the backbone) may be trained such, that minor local translations, rotations and/or color changes are disregarded by the first sub-model, such that input data having only minor differences with respect to local translations, rotations and color changes yield the same output at the output of the first sub-model. It may also result in a more efficient system (in terms of the number of computations needed).

The use of the backbone makes it possible to ignore minor changes in the input. For example, the camera may have been moved slightly after the calibration process (in which the sequence of machine-learning models has been trained on usual images for about a week) such that all content is translated by 4 pixels. If a backbone was not employed, this will have the effect of the autoencoder network predicting "old" images in which everything is off by 4 pixels. This in turn, this may result in the difference module reporting something is different (since two translated images are in effect subtracted).

The output of the first sub-model (i.e., the backbone) of the first machine-learning model is fed into the input of the second sub-model of the first machine-learning model (i.e., the decorrelation model). The role of the decorrelation module is two-fold: To balance the output of the backbone by making the outputs statistically independent with known distributions and to keep the end-to-end network from "collapsing" when trained with free parameters on the backbone. If the decorrelation module were omitted, imbalances in the backbone may lead to inaccurate results later. Furthermore, without the decorrelation module, training the end-to-end system on normal images only, as proposed in connection with FIGS. 4a and 4b, may collapse the network to produce only a constant output (in effect reporting everything as normal). The role of the decorrelation module is to ensure that the input values to (and hence the output values from) the autoencoder will have a known probability distribution. This makes it possible to directly measure the probability of an actual, observed difference between observed input and predicted output.

The decorrelation module is used to decorrelate the output of the backbone, or, if the backbone is omitted, the input data. Correspondingly, the first machine-learning model, and in particular the second sub-model of the first machine-learning model, is configured to decorrelate a plurality of sub-components of the input data to generate the pre-processed input data. In particular, the first machine-learning model (e.g., the second sub-model of the first machine-learning model) may be trained to transform the input data such, that the pre-processed input data comprises a plurality of sub-components being statistically independent with a known probability distribution. For example, if the input data is image data comprising a plurality of pixels, the plurality of pixels may correspond to the plurality of sub-components of the input data. If the input data has been transformed by the image backbone, the resulting sub-components of the representation (e.g., the first and second dimension of the output of the backbone) may correspond to the plurality of sub-components being decorrelated.

The aim of the decorrelation module is thus to output a representation in which the components can be interpreted as independent and identically distributed random variables when considered over the whole image (or sample of input data), but as constants when looking at a specific position in the image (or in the sample of input data). The decorrelation is used to provide a normalized output for the subsequent differencing step (which identifies the actual anomalies) to be accurate.

The output from the decorrelation module may have the same resolution as the output from the preceding step (the backbone) but may have fewer channels, e.g., $w_2 \times h_2 \times d_3$, with $d_3=384$. For example, the decorrelation may be trained to transform a $w_2 \times h_2 \times d_2$ dimensional input (e.g., the input data, or the output of the backbone) with a previously unknown distribution (with potentially dependent values) into an output in which all cells and all output dimensions can be regarded as independently identically distributed random variables (e.g., with a mean 0.0 and a variance 1.0). In other words, the first machine-learning model may comprise a backbone component trained to transform the image data into a representation having the first dimension $w_2$, the second dimension $h_2$ and the depth $d_2$, and a decorrelation component trained to decorrelate the transformed image data to generate the pre-processed input data with the plurality of sub-components being statistically independent with a known probability distribution (and, optionally, having a different depth $d_3<d_2$). The decorrelation function may be trained with a specific loss function, which is detailed in connection with FIGS. 4a to 4b.

The pre-processed input data (with the above properties) is subsequently provided to the second machine-learning model, which is an auto-encoder. In other words, the output of the decorrelation network (i.e., the second sub-model of the first machine-learning model) is fed into an autoencoder. The output format of the autoencoder is identical to its input format.

An autoencoder consists of the combination of an encoder (which typically compresses the input (e.g., image) into a lower dimensional representation) and a decoder (which restores the input (e.g., image)). Accordingly, the second machine-learning model may comprise an encoder component and a decoder component. Referring to the image-based example, the auto-encoder network may be trained in such a way that the output of a cell in the two-dimensional array will change if there is an anomaly in the input image at the corresponding location (see detailed explanation of the training process in connection with FIGS. 4a and 4b).

The output (and input) of the second machine-learning model is subsequently used to determine the presence of the anomaly within the input data. This may be done by "differencing" (i.e. calculating the difference between, e.g., by subtracting one from the other) the input and output of the second machine-learning model. In other words, the apparatus may be configured to determine a difference between the pre-processed input data (i.e., the input of the second machine-learning model) and the output of the second machine-learning model to determine the presence of the anomaly within the input data. Correspondingly, the method may comprise determining 120 the difference between the pre-processed input data and the output of the second machine-learning model to determine the presence of the anomaly within the input data.

For example, for each sub-component (e.g., cell generated by the backbone), the magnitude of the resulting vector representing the difference may be computed. In other words, the difference may be computed for each value $v \in d_3$ for each sub-component (e.g., each cell of the two-dimensional grid of cells $w_2 \times h_2$), and the values $v \in d_3$ may be combined for each sub-component to determine the magnitude of the difference for the respective sub-component. The magnitudes may optionally be subject to soft thresholding (using e.g., a ReLU function, a Rectifying Linear Unit). This yields a change map of depth 1 and a resolution of $w_2 \times h_2$, where a high number in a specific cell indicates a corresponding high probability of an anomaly occurring in that position. For example, this two-dimensional change map may represent the difference between the pre-processed input data and the output of the second machine-learning model. For example, the two-dimensional change map may be used to represent information on the difference between the pre-processed input data and the output of the second machine-learning model. For example, by determining the difference, i.e., the change map, or a derivative thereof, the presence of the anomaly may be determined—even if no subsequent processing is performed to check whether an anomaly is present in the difference. In other words, determining the presence of the anomaly may comprise, or consist of, determining the difference between the pre-processed input data and the output of the second machine-learning model, or a derivative thereof.

The differencing may include an optional blurring of the difference. In other words, the apparatus may be configured to apply blurring on the difference between the pre-processed input data and the output of the second machine-learning model. Correspondingly, the method may comprise applying blurring 140 on the difference between the pre-processed input data and the output of the second machine-learning model. The presence and/or a location of the anomaly may be determined based on the blurred difference between the pre-processed input data and the output of the second machine-learning model and based on at least one threshold. By applying blurring, the change map is subjected to an averaging process in order to identify larger changes and to make the whole process more robust against noise. The averaging process may blur the image using a user-specified kernel and kernel size, e.g., using a rectangular kernel with size 3×3 (which is used to calculate an average over 3×3 cells/sub-components and replaces the value of the center cell/sub-component of the 3×3 cells/sub-components with the average vale). The output may have the same dimensions as the change map (e.g., $w_2 \times h_2$).

Subsequently, the (blurred) change map may be subjected to thresholding, in which regions with values that are too low are disregarded. In other words, the apparatus may be configured to determine the presence and/or a location of the anomaly based on the difference and based on at least one threshold. For example, cells having a value of at most the at least one threshold may be disregarded in determining the presence and/or a location of the anomaly.

In some examples, clustering may be applied to the change map. The purpose of the clustering is to make it possible for the system to ignore small anomalies, i.e., ones that only take up a single cell. The clustering identifies connected cells that have successfully passed the thresholding step. Single cells (not part of a cluster) or clusters being smaller than a pre-defined size may be disregarded. Other processing steps with user-defined parameters may be used to further filter the change map. The clustering can be implemented using computer vision algorithms such as dilation and erosion.

There are various other techniques that can be applied to make the anomaly detection more robust. For example, multi-frame (e.g., over multiple samples of input data) averaging of the change map can further enhance robustness. Additionally or alternatively, hysteresis for noise control can be added for temporal coherence (to stop bounding boxes from blinking on and off in borderline cases).

The above techniques, i.e., "blurring", "thresholding" and "clustering", determine the sensitivity of the anomaly detection, i.e. the propensity of the anomaly detection to yield false positives or false negatives. Different parameters, e.g., regarding the blurring, thresholding and/or clustering, may be exposed to the user in order to change sensitivity and balance false positive and false negative rates. For example, the at least one threshold, a blurring parameter (e.g., kernel size and/or shape) being used for blurring the difference between the pre-processed input data and the output of the second machine-learning model, and/or a clustering parameter (e.g., a clustering threshold), may be set by an external entity. The method may comprise setting 130 the at least one threshold, the blurring parameter and/or the clustering parameter based on input from the external entity. For example, if the apparatus is part of an embedded device (e.g. of a camera device), the respective threshold/parameter(s) may be set by a central device, such as a video management system, being connected to the embedded device.

Once the difference, e.g., the change map, is determined, it can be provided by the apparatus, method and computer program, e.g., as an anomaly report. For example, the apparatus may be configured to provide information on the anomaly. Accordingly, the method may comprise providing 170 the information on the anomaly. For example, two main scenarios may be distinguished—the scenario of FIGS. 3a and 3b, where the apparatus is integrated in the device providing the input data, and another scenario, where the apparatus is integrated in a central device, with the input data being provided by one or more peripheral devices. For example, the apparatus, method and computer program may be integrated in an embedded device in combination with the camera or on a centralized server (in a server room or in the cloud).

Figure 4A:
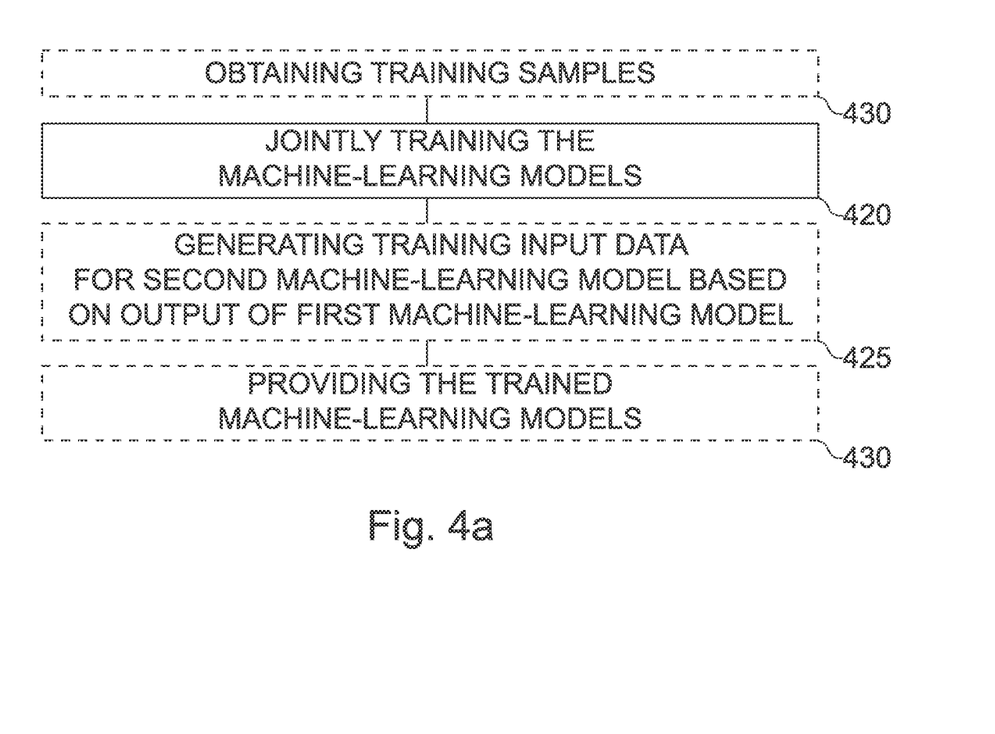
FIG. 4a shows a flow chart of an example of a method for training a sequence of machine-learning models for use in anomaly detection.
Figure 4B:
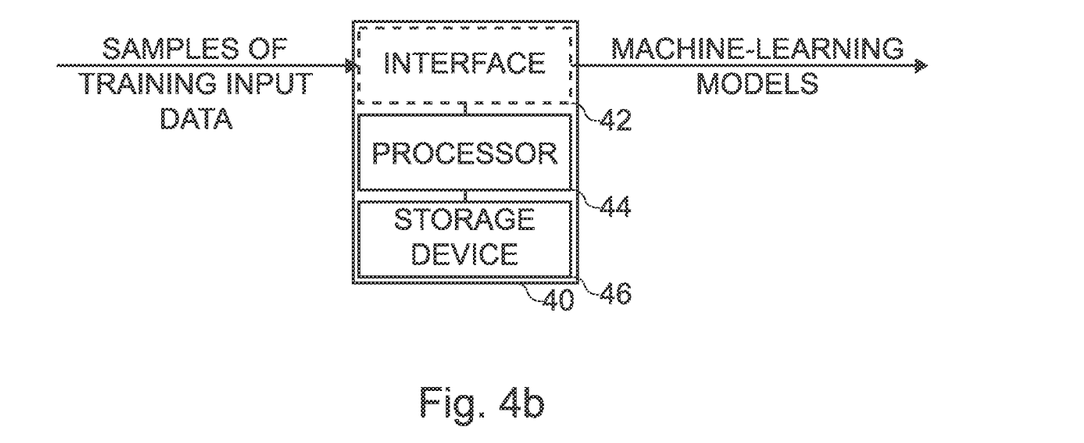
FIG. 4b shows a block diagram of an example of an apparatus for training a sequence of machine-learning models for use in anomaly detection.

Similarly, the calibration algorithm shown in connection with FIGS. 4a and 4b can run on the same hardware device or on a centralized server.

Figure 3B:
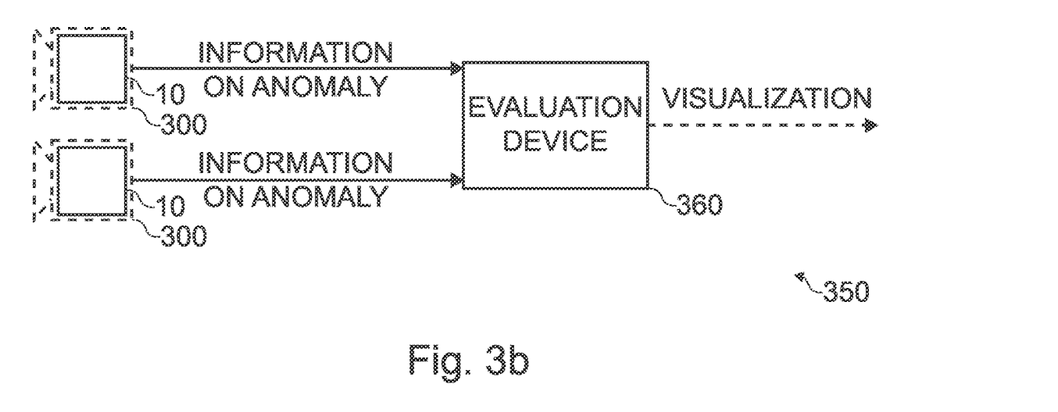
FIG. 3b shows a schematic diagram of an example of a system comprising an evaluation device and one or more apparatuses for detecting an anomaly in input data.

In case the apparatus is part of the camera device, the information on the anomaly may be provided with the input data, e.g., to a central device. For example, the apparatus may be integrated within a camera device, as shown in FIGS. 3a and 3b, e.g., a surveillance camera. The camera device may comprise an imaging sensor for generating the input data. The apparatus may be configured to analyze the input data, and to provide the information on the anomaly together within the input data at an output of the camera device. The information on the anomaly may be provided in the form of structured data, e.g., in the form of JSON (JavaScript Object Notation)-formatted text, or in the form of an overlay on the existing video feed. In other words, the information on the anomaly may be provided as an overlay over the image date at an output of the camera device, by the apparatus, or as metadata accompanying the input data. For example, two video streams may be provided by the camera device, one corresponds to the input data (or a processed version thereof), and one, in which the input data (or a processed version thereof) is overlaid with the information on the anomaly. For example, the information on the anomaly can be presented in a new video stream where the input video stream is overlaid with the rectangles that indicate anomalies. Such a system has the advantage of being easy to interface with existing VMSs as the output can be presented to the VMS as a new virtual/intelligent camera. In some examples, the two approaches may be combined by embedding alerts as metadata in the video stream.

If the apparatus is integrated in a central device, such as a VMS, the information on the anomaly may be provided via a display device, e.g., a display device of the VMS, such as a computer monitor or surveillance monitor. For example, the information on the anomaly may be overlaid over the input data in a video or control signal provided to the display device. Alerts regarding the anomaly may be provided via the display device, as audio alerts or alarm lights.

The information on the anomaly may comprise different types of information. For example, in some cases, the information on the anomaly may comprise information on the difference between the pre-processed input data and the output of the second machine-learning model, e.g. a representation of the change map (or a derivative thereof). Additionally or alternatively, the information on the anomaly may comprise an indicator regarding the presence of the anomaly, e.g., an indicator representing whether an anomaly is present or not.

In some examples, the proposed concept may also be used to determine a location of the anomaly within the input data. The apparatus may be configured to determine a location of the anomaly within the input data based on the difference, and to provide information on the location of the anomaly (as part of the information on the anomaly). For example, if sensor data is processed, a sample of the input data comprising anomalous components may be determined. If financial data is processed, a financial transaction included in the financial data that is deemed to be anomalous may be isolated. In the above example of the input data being image data, each sub-component/cell of the pre-processed input data may be based on one or more pixels (e.g., a region of pixels) of the input data. Based on the relationship between the sub-components and the pixels, the location of the anomaly within the input data may be determined based on the difference (e.g., based on the change map). For example, the information on the location of the component may comprise one or more coordinates of a bounding box encompassing the anomaly. This bounding box may be included as an overlay over the input data, e.g. by the apparatus, or by an evaluation device receiving the information on the anomaly from the camera device. For example, minimal axis-parallel bounding boxes that enclose the anomaly (e.g. based on the output of the thresholding or clustering) may be output as information on the anomaly or as information on the location of the anomaly.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge, e.g. based on the training performed by the machine-learning algorithm. In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the first and second machine-learning models may artificial neural networks (ANNs). ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. Consequently, the training of an artificial neural network may comprise adjusting the weights of the nodes and/or edges of the artificial neural network, i.e. to achieve a desired output for a given input. In at least some embodiments, the machine-learning models may be deep neural network, e.g. a neural network comprising one or more layers of hidden nodes (i.e. hidden layers), preferably a plurality of layers of hidden nodes.

In particular, so-called convolutional neural networks may be used for all deep network sub-components. In other words, the first and second machine-learning model may be convolutional neural networks. Such neural networks may be used to process input data that is image data, for example. This may result in a system which is also invariant to where objects are specifically positioned in the image. Such a system may also be capable of learning to ignore specific objects (that are present in the non-anomalous training videos) even if they are not in the same position as in the training videos.

In the context of the above examples, the proposed concept was introduced to provide a real-time analysis of the input data. Alternatively, the proposed concept may be applied on aggregated input data of the past. For example, the anomaly detection algorithm itself can be applied to existing recorded video footage.

The at least one interface 12 introduced in connection with FIG. 1a, may correspond to one or more inputs and/or outputs for receiving and/or transmitting information, which may be in digital (bit) values according to a specified code, within a module, between modules or between modules of different entities. For example, the at least one interface 12 may comprise interface circuitry configured to receive and/or transmit information. For example, the one or more processors 14 introduced in connection with FIG. 1a may be implemented using one or more processing units, one or more processing devices, any means for processing, such as a processor, a computer or a programmable hardware component being operable with accordingly adapted software. In other words, the described function of the one or more processors 14 may as well be implemented in software, which is then executed on one or more programmable hardware components. Such hardware components may comprise a general-purpose processor, a Digital Signal Processor (DSP), a micro-controller, etc. In some examples, the one or more processors may be or comprise one or more computing accelerator devices, such as a Field-Programmable Gate Array (FPGA) or a General-Purpose Graphics Processing Unit (GPGPU).

For example, the one or more storage devices 16 introduced in connection with FIG. 1a may comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

For example, the described apparatus may be included in a server (with the sequence of machine-learning models being executed on a GPGPU, for example) or on an embedded device (FPGA, embedded GPGPU or specialized chips for deep networks).

More details and aspects of the apparatus, method and computer program for detecting an anomaly in input data are mentioned in connection with the proposed concept or one or more examples described above or below (e.g. FIGS. 3a to 4b). The apparatus, method and computer program may comprise one or more additional optional features corresponding to one or more aspects of the proposed concept or one or more examples described above or below.

In the following, two applications of the proposed apparatus, method and computer program are introduced—a first in FIG. 3a, where the apparatus is integrated in a camera device, such as a surveillance camera, and a second, in FIG. 3b, where one or more apparatuses are used in combination with an evaluation device that relies on the output of the respective apparatuses.

FIG. 3a shows a schematic diagram of an example of a camera device 300 comprising an apparatus for detecting an anomaly in input data. The camera device 300 comprises an imaging sensor 310 and the apparatus 10 introduced in connection with FIGS. 1a to 2b. The imaging sensor is configured to generate the input data, and the apparatus is configured to process the input data generated by the image sensor. For example, the camera device may be a surveillance camera, for example an IP camera (i.e., a camera being connected via a network that is based on the Internet Protocol), a PoE camera (i.e., a camera being connected via an Ethernet network, in which the power of the camera is also provided via over Ethernet, according to the Power over Ethernet standard), a USB camera (i.e., a camera being connected via the Universal Serial Bus, or a camera using another interface for outputting image data.

The apparatus of the camera device may be configured to provide information on the anomaly that is determined based on the input data of the imaging sensor, as described in connection with FIGS. 1a to 2b. For example, the apparatus may be configured to provide the information on the anomaly to an external/central evaluation device. For example, the apparatus may be configured to provide the information on the anomaly overlaid over the input data as a video stream, or to provide the input data as a video stream and the information on the anomaly as metadata included with the video stream. In some examples, two separate video streams may be provided, e.g. one with and one without the overlay.

In particular, as introduced in connection with FIGS. 1a to 2b, the apparatus may be configured to determine a location of the anomaly within the input data, and to generate an overlay high-lighting the location of the anomaly (e.g., by drawing a bounding box around the anomaly), and to output a combined representation comprising the input data and the overlay highlighting the location of the anomaly in the input data, e.g. as a video stream.

In general, the imaging sensor may comprise an APS (Active Pixel Sensor)- or a CCD (Charge-Coupled-Device)-based imaging sensor. For example, in APS-based imaging sensors, light is recorded at each pixel using a photodetector and an active amplifier of the pixel. APS-based imaging sensors are often based on CMOS (Complementary Metal-Oxide-Semiconductor). In CCD-based imaging sensors, incoming photons are converted into electron charges at a semiconductor-oxide interface, which are subsequently moved between capacitive bins in the imaging sensor modules by a control circuitry of the sensor imaging module to perform the imaging. Alternatively, or additionally, the imaging sensor may be a depth-sensing camera or comprise a depth sensor, suitable for providing depth-sensing input data. Accordingly, the input data may be a depth-sensing input data or comprise a two-dimensional and a depth-sensing component. For example, the imaging sensor may comprise a depth sensor, e.g. a Time of Flight-based depth sensor or a structured light-based depth sensor. The input data may comprise two-dimensional camera image data and/or three-dimensional camera image data.

More details and aspects of the camera device are mentioned in connection with the proposed concept or one or more examples described above or below (e.g. FIGS. 1a to 2b, 3b to 4b). The camera device may comprise one or more additional optional features corresponding to one or more aspects of the proposed concept or one or more examples described above or below.

FIG. 3b shows a schematic diagram of an example of a system 350 comprising an evaluation device 360 and at least one apparatus 10 for detecting an anomaly in input data, e.g. one or more cameras 300 with one or more apparatuses 10, as shown in connection with FIG. 3a. The at least one apparatus is configured to provide information on the difference between the preprocessed input data and the output of the second machine-learning model to the evaluation device. The evaluation device is configured to process the information on the difference to determine the presence of an anomaly in the input data.

In the scenario outlined in FIG. 3b, the at least one apparatus 10 is used to determine the difference between the pre-processed input data and the output of the second machine-learning model on-device, with the final processing being done on a central evaluation device. In this case, the fine-tuning of the anomaly detection, e.g., with respect to blurring, thresholding, clustering and location detection, can be performed by the evaluation device.

For example, instead of the apparatus, the evaluation device may be configured to determine the presence and/or a location of the anomaly based on the difference and based on at least one threshold. Similarly, the evaluation device may be configured to apply blurring on the difference between the pre-processed input data and the output of the second machine-learning model, and to determine the presence and/or the location of the anomaly based on the blurred difference between the pre-processed input data and the output of the second machine-learning model and based on at least one threshold. Similarly, clustering may be applied by the evaluation device. The respective features may be implemented similar to the features introduced in connection with the apparatus of FIGS. 1a to 2b.

In a multi-camera setup with overlapping camera fields of view, it is also possible to combine 2D knowledge of anomalies from each of the cameras in order to obtain knowledge about the 3D position of the anomalies. For example, the evaluation device may be configured to obtain the information on the difference from two or more apparatuses 10. The evaluation device may be configured to determine respective locations of the anomaly in the input data of the respective apparatuses based on the respective difference, and to determine a three-dimensional location of the anomaly based on the respective locations of the anomaly in the input data of the respective apparatuses. For example, based on a known orientation of cameras comprising the two or more apparatus, the three-dimensional location of the anomaly may be triangulated based on the respective location of the anomaly in the input data of the respective camera devices.

In the following, the training and calibration process is outlined. This calibration process can run on the server (e.g., on a GPGPU) or on an embedded device (FPGA, embedded GPGPU or specialized chips for deep networks), e.g. directly in the apparatus 10 of the camera device.

FIG. 4a shows a flow chart of an example of a (computer-implemented) method for training a sequence of machine-learning models for use in anomaly detection, e.g., the sequence of machine-learning models introduced in connection with FIGS. 1a to 2b. To recapitulate, the sequence of machine-learning models comprises a first machine-learning model configured to pre-process the input data to provide pre-processed input data and a second machine-learning model configured to process the pre-processed input data to provide output data. The first machine-learning model is trained to process the input data such, that the pre-processed input data comprises a plurality of sub-components being statistically independent with a known probability distribution. The second machine-learning model is an auto-encoder. The method comprises jointly training 410 the sequence of machine-learning models based on a set of samples of training input data excluding anomalies.

FIG. 4b shows a block diagram of an example of a corresponding apparatus 40 for training a sequence of machine-learning models for use in anomaly detection. The apparatus 40 comprises one or more processors 44, one or more storage devices 46 and an optional interface 42. For example, the interface 42, the one or more processors 44 and the one or more storage devices 46 may be implemented similar to the respective components 12; 14; 16 of the apparatus 10. In particular, the functionality of the apparatus 40 may also be performed by the apparatus 10 of FIGS. 1a to 2b. The apparatus 40, and optionally the apparatus 10 of FIGS. 1a to 2b, is configured to perform the method of FIG. 4a.

The following description relates to the method of FIG. 4a, the corresponding apparatus 40 of FIG. 4b, and to a corresponding computer program. Features introduced in connection with the method may likewise be applied to the corresponding apparatus and computer program (and vice versa).

The method, apparatus and computer program of FIGS. 4a and 4b relate to the training and calibration of the sequence of machine-learning models (as introduced in connection with FIGS. 1a to 1b.

The training is performed following two paradigms—the training is performed as joint training, i.e., the first and second machine-learning model are trained together, and the training is performed based on "normal" input data (excluding anomalies). The first paradigm is followed to avoid the second machine-learning model from "collapsing" during training. The second paradigm is followed due to the spurious nature of anomalous input data.

In the proposed concept, the sequence of machine-learning models is trained for the input data, and thus the environment, that the sequence of machine-learning models is to be used in. For example, if the input data being used with the sequence of machine-learning models originates from an imaging sensor of a surveillance camera, the sequence of machine-learning models may be trained using a set of samples of training input data comprising imaging sensor data of said surveillance camera, as recorded at the location of the specific surveillance camera. In particular, the sequence of machine-learning models may be trained based on a set of samples of training input data gathered from the source of the input data to be used with the sequence of machine-learning models. In other words, the sequence of machine-learning models may be tailored to the input data to be processed by the sequence of machine-learning models, e.g., to the source of the input data to be processed by the sequence of machine-learning models. Referring back to the example used in connection with FIGS. 1a to 3b, the sequence of machine-learning models may be trained based on a set of samples of training input data generated by the camera device that is to provide the input data during usage of the sequence of machine-learning models.

Referring to the above example of the input data being image data of a surveillance cameras, the network may be trained by using recorded footage (i.e. recorded video data) of situations without anomalies. For example, the footage may span a time interval representing different conditions, e.g. over a week of time, so that different weather, different lighting, different number of people visible in the footage etc. are represented by the recorded footage (or more to included seasonal changes). The calibration can also take place on pre-existing footage if it has been already archived (usually for other purposes). The footage may include different PZT (pan/tilt/zoom) settings of the camera, or different geometrical layouts of the environment (in case of moving escalators, open/closing doors etc.). Additional data augmentation can be applied during the training process (such as translations, rotations, scaling, local perturbations, color changes etc.). For example, the recorded footage, including the optional augmentations, may correspond to the set of samples of training input data. For example, each frame or keyframe of the recorded footage, or a subset of frames or keyframes of the recorded footage may correspond to a sample of training input data of the set of samples. It is possible to train the machine-learning models (and in particular a specialized backend) to work directly on the compressed key frames of the H.264/H.265 stream.

The complete sequence of machine-learning models comprises multiple deep networks (e.g., the first and second machine-learning model) and additional non-machine-learning algorithms as detailed above. The deep networks need to be trained, i.e., to determine suitable, or optimal, weights between the artificial neurons.

Machine-learning models are trained using samples of training input data. In the proposed concept, the training input data is highly similar to the input data to be analyzed subsequently for anomalies. In particular, the training input data excludes anomalies. In this context, the term "excludes anomalies" is not necessarily an absolute. In some cases, some amount of anomalies may be tolerated. For example, at most 1% (or at most 0.1%, or at most 0.01%) of the samples of training input data may represent an anomaly. However, the set of samples of training input data might not be enriched with samples representing anomalies.

The proposed sequence of machine-learning models comprises two main components—the first machine-learning models for decorrelating the input data, and the second machine-learning model that is the auto-encoder. The training of these two components required different goals—the training of the first machine-learning model is used to train the first machine-learning model to decorrelate the input data, and the training of the second machine-learning model is used to train the second machine-learning model to reconstruct the pre-processed input data (under the assumption that the pre-processed input data is not anomalous.

Therefore, two different loss functions may be used for the two goals. In other words, the first machine-learning model may be trained based on a first loss function and the second machine-learning model may be trained based on a second loss function. The first and second loss functions may be combined for the joint training of the first and second machine-learning model. For example, the sequence of machine-learning models may be trained using a loss function L, which is composed of (or comprises) a weighted sum of two sub loss functions, the decorrelation loss $L_d$ (i.e., the first loss function) and the reconstruction loss (for the auto-encoder, i.e., the second loss function) $L_r$, i.e., $L = a \cdot L_d + b \cdot L_r$.

The training is performed in an end-to-end fashion in which the interconnected networks of the sequence of machine-learning models are trained simultaneously (and are thus trained jointly).

In the following, an example for the training of the second machine-learning model is given. In general, the training of autoencoders is based on unsupervised learning, as the training samples being used are unlabeled. In other words, the second machine-learning model may be trained using unsupervised learning. In particular, the task of an autoencoder is to reduce the dimensionality of the input by encoding the input, and then reconstructing the input again. To achieve an accurate reconstruction, the autoencoder is trained on samples of training input data that are highly similar to the input to be encoded and reconstructed during operation. In other words, the second machine-learning models "learns" the content usually present at the input, so that it can be reconstructed after encoding. As the sequence of machine-learning models is trained on "normal" samples of training input data, i.e., samples of training input data excluding anomalies, the second machine-learning model (only) learns to output the data input into the second machine-learning model without anomalies. If now, at the input of the second machine-learning model, the input contains an anomaly, it is (most likely) not reconstructed by the decoder component of the second machine-learning model. Therefore, the difference between the input and the output of the second machine-learning model reveals the presence of an anomaly.

During training of the second machine-learning model, this property to generate a normal output from an anomalous input is trained, by artificially introducing anomalies in the input, and training the second machine-learning model to output the corresponding input without the anomalies. The second machine-learning model is thus trained as a noisy autoencoder.

Since the second machine-learning model is used, and trained, jointly with the first machine-learning model, the first machine-learning model is used to generate the input for the second machine-learning model, with the anomalies being introduced into the input between the first and the second machine-learning model. In other words, the second machine-learning model may be trained by generating 415 training input data for the second machine-learning model based on the pre-processed input data provided by the first machine-learning model during the training of the sequence of machine-learning models. In particular, a subset of the sub-components of the pre-processed input data may be altered before the pre-processed input data is provided to the second machine-learning model, e.g., set to a pre-defined value or set to random values. For example, a subset of the plurality of sub-components of the pre-processed input data may be set to a fixed (or random) value in the training input data for the second machine-learning model. For example, the input to the second machine-learning model may be heavily augmented by the use of 50% drop-out in the input, i.e., half of the sub-components may be set to value 0.0. The second machine-learning model is then trained to reconstruct the original input, by setting the loss function of the training based on the difference between the output of the second machine-learning model and the original (unmodified) input of the second machine-learning model. In other words, the second loss function may be based on a difference between the output of the second machine-learning model and the pre-processed input data.

In the following, an example is given for the second loss function. Let y be the output from the decorrelation module and let $y_{noisy}$ be a noisy version of y (i.e. the pre-processed input data) where approximately half of the cells/sub-components have their value set to zero. Let the function g denote the autoencoder operation. Furthermore, let $z=g(y_{noisy})$ be the output of the autoencoder (i.e., the output of the second machine-learning model). The prediction module (i.e., the sequence of machine-learning model) may be trained to report y as the output when using $y_{noisy}$ as the input. For example, the loss function may be defined as:

$$L_r = \sum_i (z_i - y_i)^2$$

where the variable i is an index over all sub-components, e.g., image cells.

If the decorrelation module (i.e., the second sub-model of the first machine-learning model) was not present, training with the above loss function $L_r$ simultaneously both backbone and autoencoder may result in a "collapsed" total network which will always output a constant value. This may render the complete system useless because no anomalies might ever be detected.

In the following, the training of the first machine-learning model is introduced in more detail. As outlined in connection with FIGS. 1a to 2b, the first machine-learning model may comprise a backbone component (i.e., the first sub-model) and a decorrelation component (i.e., the second sub-model). In general, a pre-trained backbone (i.e., first sub-model of the first machine-learning model) may be used for the optional first sub-model of the first machine-learning model, as such backbones exist and are commonly available, see e.g., AlexNet, ResNet-101 or MobileNet. During the training of the machine-learning model, the weights of the backbone may be frozen since the backbone usually has already been trained. In other words, the first sub-model of the first machine-learning model may be an artificial neural network, and in particular a deep neural network or deep convolutional neural network. Weights between neurons of the backbone component may be fixed (i.e., frozen) during the joint training of the sequence of machine-learning models. This makes training faster and may require a smaller number of training samples. Using frozen weights, however, may result in a diminished accuracy of the combined system. Therefore, alternatively, the weights of the backbone component may be adapted during the training of the sequence of machine-learning models.

In the following, the training of the second sub-model of the first machine-learning model is detailed, i.e., the training of the decorrelation module. The decorrelation module is trained in such a way to make its outputs statistically decorrelated in order for them to become be as independent as possible. This may be done by constraining each pair of outputs mathematically to be decorrelated. This may ensure that the output from the backbone does not collapse into a constant function.

To achieve this goal, an unsupervised learning-based training may be used to train the decorrelation module, with a loss function that is targeted at minimizing correlations between the sub-components. For example, the decorrelation loss $L_d$ may be the sum of all cross-correlations of each pair of (different) output cells/sub-components from the decorrelation module. In other words, the first loss function may be based on the sum of cross-correlations of pairs of different sub-components of the pre-processed input data.

In the following, a first example of such a loss function is given. Let the function g denote the decorrelation operation being performed by the decorrelation module. Let y be the output from the decorrelation, i.e., y=f(x), where x is the input data (e.g., an image, represented as output from the backbone). Furthermore, let Y be the normalized version, i.e., $$Y_i = \frac{y_i - mean_t(y(t))}{stdev_t(y(t))},$$

where $mean_t$ and $stdev_t$ denotes respectively the mean and standard deviation over all possible images x(t). Then $$L_d = \sum_t \sum_{i_1} \sum_{i_2 \neq i_1} (Y_{i_1}(t) \cdot Y_{i_2}(t))^2.$$

may be used as first loss function $L_d$. The index t sums over all samples (e.g., images) in the set of samples of training input data.

In the following, a more efficient loss function for training the decorrelation module is shown. An important computational efficiency optimization of the training step can be done by using the following contrastive loss function instead. Instead of training all sum-components (e.g., image cells) and output dimensions to be statistically independent, the decorrelation module may be trained for orthogonality of the input data representations (e.g., image representations) between different samples of input data:

$$L_{new_d} = \sum_{t_1} \sum_{t_2 \neq t_1} \sum_i (Y_i(t_1) * Y_i(t_2))^2$$

Note that two samples of input data (e.g., images) from two different time steps $t_1$, $t_2$ are used for each term in the loss function. It can be shown that this loss function has the same value as $L_d$ described above. However, its (approximate) calculation can be implemented with less computational burden if $t_1$ and $t_2$ are sampled from the set of samples of training input data (e.g., training images) (instead of using all possible pairs $t_1$ and $t_2$). In effect, the output representations are "pushed" away by requiring orthogonality in representations from different time steps instead of requiring all output values to be uncorrelated.

After training the network and in this way calibrating the specific setup, their weights are frozen and used henceforth for real-time anomaly detection.

The calibration can also take place on pre-existing footage if it has been already archived (usually for other purposes). Similarly, the anomaly detection algorithm itself can be applied to existing recorded video footage.

In a multi-camera setup, the results of the calibration process (i.e., the trained deep network weights) can be shared between cameras such that a new camera will "inherit" the results from training other cameras placed in a similar position (this will shorten the expected period of time necessary for calibration).

More details and aspects of the method, apparatus and computer program for training the sequence of machine-learning models are mentioned in connection with the proposed concept or one or more examples described above or below (e.g. FIG. 1a to 3b). The method, apparatus and computer program for training the sequence of machine-learning models may comprise one or more additional optional features corresponding to one or more aspects of the proposed concept or one or more examples described above or below.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An apparatus (10) for detecting an anomaly in input data, wherein the input data is image data, the apparatus comprising one or more processors (14) and one or more storage devices (16), wherein the apparatus is configured to:
   process the input data using a sequence of machine-learning models, the sequence of machine-learning models comprising a first machine-learning model configured to pre-process the input data to provide pre-processed input data and a second machine-learning model configured to process the pre-processed input data to provide output data,
   wherein the first machine-learning model is trained to transform the input data such, that the pre-processed input data comprises a plurality of sub-components being statistically independent with a known probability distribution, and wherein the second machine-learning model is an auto-encoder;
   determine a difference between the pre-processed input data and the output of the second machine-learning model;
   apply blurring on the difference between the pre-processed input data and the output of the second machine-learning mode;
   determine a presence of an anomaly within the input data based on the blurred difference between the pre-processed input data and the output of the second machine-learning model.

2. The apparatus according to claim 1, wherein the first machine-learning model is trained to decorrelate a plurality of sub-components of the input data to generate the pre-processed input data.

3. The apparatus according to claim 2, wherein the image data comprises a plurality of pixels, the plurality of pixels corresponding to the plurality of sub-components of the input data.

4. The apparatus according to claim 3, wherein the image data comprises a two-dimensional grid of pixels of width $w_1$, height $h_1$ and number of color channels $d_1$, wherein the first machine-learning model is trained to transform the image data into the pre-processed input data having a first dimension $w_2$, a second dimension $h_2$ and a third dimension $d_2$, with $w_2 < w_1$, $h_2 < h_1$ and $d_2 > d_1$.

5. The apparatus according to claim 4, wherein the first machine-learning model comprises a backbone component trained to transform the image data into a representation having the first dimension $w_2$, the second dimension $h_2$ and the depth $d_2$, and a decorrelation component trained to decorrelate the transformed image data to generate the pre-processed input data with the plurality of sub-components being statistically independent with a known probability distribution.

6. The apparatus according to claim 1, wherein the apparatus is further configured to determine a location of the anomaly within the input data based on the difference, and to provide information on the location of the anomaly.

7. The apparatus according to claim 6, wherein the information on the location of the component comprises one or more coordinates of a bounding box encompassing the anomaly,
   and/or wherein the apparatus is configured to determine the presence and/or a location of the anomaly based on the difference and based on at least one threshold.

8. The apparatus according to claim 6, wherein the apparatus is further configured to determine the location of the anomaly based on the blurred difference between the pre-processed input data and the output of the second machine-learning model and based on at least one threshold.

9. The apparatus according to claim 7, wherein the at least one threshold and/or a blurring parameter being used for blurring the difference between the pre-processed input data and the output of the second machine-learning model is set by an external entity.

10. A method for training a sequence of machine-learning models for use in anomaly detection,
wherein the sequence of machine-learning models comprises a first machine-learning model configured to pre-process the input data to provide pre-processed input data and a second machine-learning model configured to process the pre-processed input data to provide output data,
wherein the first machine-learning model is trained to process the input data such, that the pre-processed input data comprises a plurality of sub-components being statistically independent with a known probability distribution, and wherein the second machine-learning model is an auto-encoder,
wherein the method comprises jointly training (410) the sequence of machine-learning models based on a set of samples of training input data excluding anomalies.

11. The method according to claim 10, wherein the first machine-learning model is trained based on a first loss function and wherein the second machine-learning model is trained based on a second loss function.

12. The method according to claim 11, wherein the second machine-learning model is trained by generating (415) training input data for the second machine-learning model based on the pre-processed input data provided by the first machine-learning model during the training of the sequence of machine-learning models, wherein a subset of the plurality of sub-components of the pre-processed input data is set to a fixed value in the training input data for the second machine-learning model, with the second loss function being based on a difference between the output of the second machine-learning model and the pre-processed input data.

13. The method according to claim 10, wherein the first machine-learning model comprises a backbone component and a decorrelation component, wherein weights between neurons of the backbone component are fixed during the joint training of the sequence of machine-learning models.

14. A non-transitory, computer-readable medium comprising a program code that, when the program code is executed on a processor, a computer, or a programmable hardware component, causes the processor, computer, or programmable hardware component to perform the method of claim 10.

15. A method for detecting an anomaly in input data, wherein the input data is image data, the method comprising:
processing (110) the input data using a sequence of machine-learning models, the sequence of machine-learning models comprising a first machine-learning model configured to pre-process the input data to provide pre-processed input data and a second machine-learning model configured to process the pre-processed input data to provide output data,
wherein the first machine-learning model is trained to transform the input data such, that the pre-processed input data comprises a plurality of sub-components being statistically independent with a known probability distribution, and wherein the second machine-learning model is an auto-encoder;
determining a difference between the pre-processed input data and the output of the second machine-learning model;
applying blurring on the difference between the pre-processed input data and the output of the second machine-learning mode;
determining (150) a presence of an anomaly within the input data based on the blurred difference between the pre-processed input data and the output of the second machine-learning model.

16. A non-transitory, computer-readable medium comprising a program code that, when the program code is executed on a processor, a computer, or a programmable hardware component, causes the processor, computer, or programmable hardware component to perform the method of claim 15.

* * * * *